Figure 1:
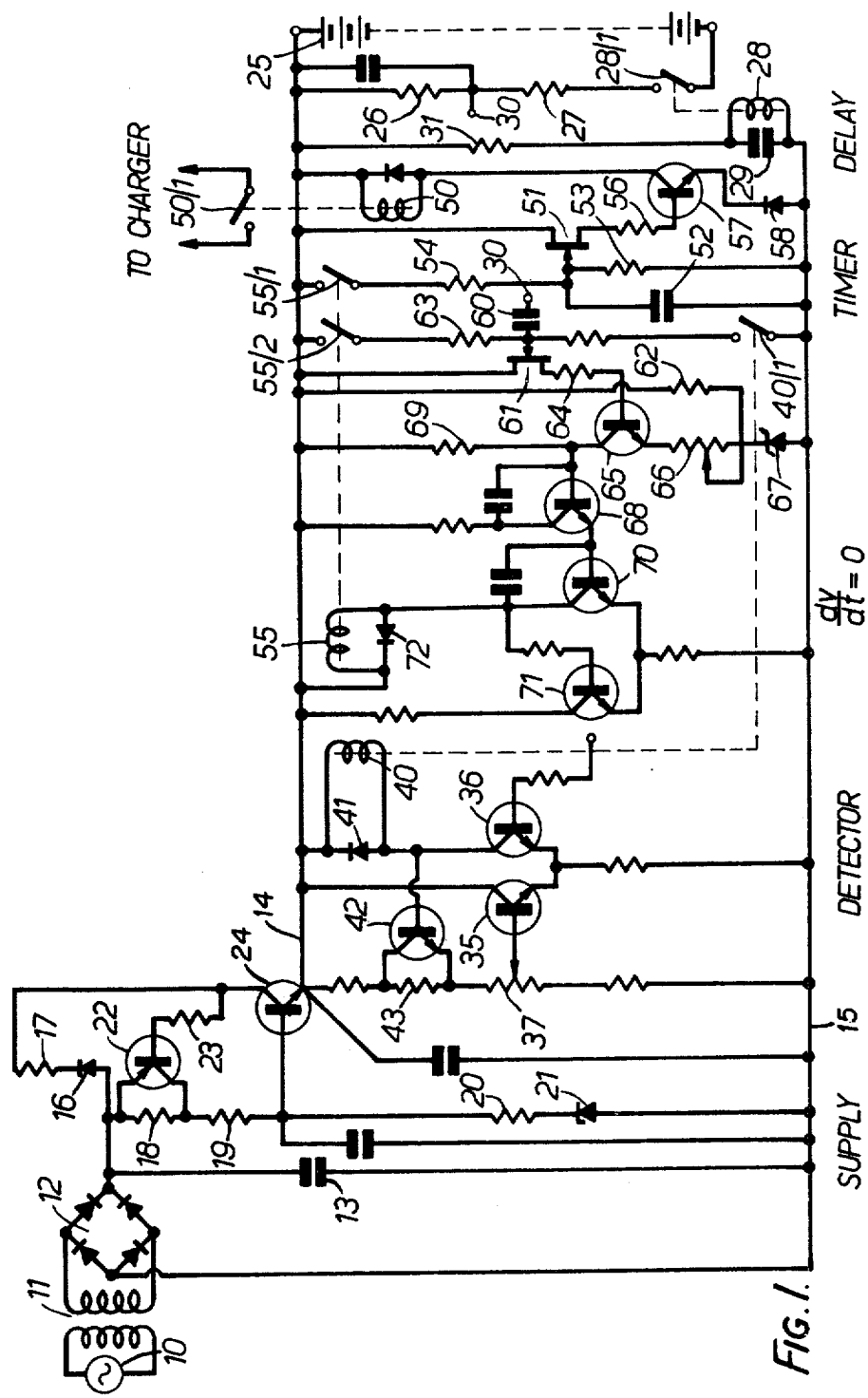

United States Patent [19]

Rock

[11] 4,213,080

[45] Jul. 15, 1980

[54] AUTOMATIC ELECTRIC BATTERY CHARGING APPARATUS

[75] Inventor: Alan Rock, Wombourne, England

[73] Assignee: Chloride Group Limited, London, England

[21] Appl. No.: 892,270

[22] Filed: Mar. 31, 1978

[30] Foreign Application Priority Data

Apr. 7, 1977 [GB] United Kingdom ............... 14863/77

[51] Int. Cl.² .............................................. H02J 7/04
[52] U.S. Cl. ...................................... 320/21; 320/23; 320/37; 320/39
[58] Field of Search ...................... 320/20, 21, 37, 38, 320/39, 40, 22–24

[56] References Cited

U.S. PATENT DOCUMENTS

| | | | |
|---|---|---|---|
| 3,761,795 | 8/1973 | Clayton et al. | 320/21 X |
| 3,794,905 | 2/1974 | Long | 320/20 |
| 3,911,349 | 10/1975 | Seely et al. | 320/20 |
| 4,034,279 | 7/1977 | Nilsson | 320/20 |
| 4,091,320 | 5/1978 | Foster | 320/37 X |

*Primary Examiner*—Robert J. Hickey

*Attorney, Agent, or Firm*—Oblon, Fisher, Spivak, McClelland & Maier

[57] ABSTRACT

An automatic electric battery charging apparatus which includes terminating means comprising a bistable circuit having set and reset conditions, means for supplying a control signal dependent on battery voltage on charge through a capacitor to an input of the bistable circuit, so as to set the circuit when the battery voltage increases, capacitor charge adjusting means operative when the bistable circuit is set, for supplying current to the capacitor to adjust the charge of the latter until it re-sets the bistable circuit, a timer arranged to be reset by the bistable circuit in its set state, and means to terminate the charge or reduce the average charging current if the timer is not reset within a predetermined time. Thus the input potential to the bistable has a sawtooth waveform while the bistable is reset the capacitor charge remains unaltered, so that the bistable input potential follows that of the battery until the bistable is set. Thereupon the charge adjusting means alters the capacitor charge to change the bistable input potential in the other direction to reset the bistable again.

6 Claims, 3 Drawing Figures

AUTOMATIC ELECTRIC BATTERY CHARGING APPARATUS

This invention relates to automatic battery charging apparatus including terminating means for initiating the termination of a phase of a charge.

Many proposals have in the past been put forward for automatically terminating the charge of a battery when the battery is fully charged.

Among these the present applicant's British Patent Specification No. 1097451 described a charger in which the initiation of termination of the charge is dependant upon the rate of rise of battery voltage, and in particular occurs when the rate of rise falls off as the battery approaches the fully charged condition. The present applicants's U.S. Pat. No. 3,979,658 describes another arrangement working on the same principle. An object of the present invention is to provide a further arrangement, which will be reliable though simple, also working on the same principle.

According to the present invention, automatic electric battery charging apparatus includes terminating means responsive to the rate of change of a control signal, dependent on the battery voltage while on charge when the rate of change of the said signal falls below a predetermined value, the terminating means including a bistable circuit having set and reset conditions, means for supplying a control signal dependent on battery voltage on charge through a capacitor to an input of the bistable circuit, so as to set the circuit when the battery voltage increases, capacitor charge adjusting means operative when the bistable circuit is set, for supplying current to the capacitor to adjust the charge of the latter until it re-sets the bistable circuit, and a timer arranged to be reset by the bistable circuit in its set state and means to terminate the charge or reduce the average charging current if the timer is not reset within a predetermined time.

The input circuit of the bistable circuit should be of high impendance, for example it preferably comprises a field effect transistor (F.E.T.). It is well known that the input impendance of a field effect transistor is extremely high, and this is important in connection with the present invention to ensure that when the capacitor is charged to a given potential and it remains connected only to the bistable circuit and the battery, the charge will not change.

Moreover, preferably the circuit includes means for charging the capacitor initially when the battery voltage is low, and the charge adjusting means serves to progressively reduce the said charge on the capacitor. As described more fully below this has the advantage that if at any time the capacitor should have a tendency to leak, the effect will be fail safe in the sense that the charge will be terminated too soon rather than not being terminated. This is desirable since whereas premature termination merely results in the battery being only partially charged excessive charging may result in overheating and damage to the battery or even in extreme cases fire or explosion.

The second of the prior specifications referred to above is directed to employing a control signal which is compensated for variations of the voltage of the alternating current mains supply. This is of great practical importance in an automatic charger working on the principle referred to since otherwise a fall of mains voltage will produce a fall of battery voltage, and this may produce a spurious indication indistinguishable from the leveling out of battery voltage when the battery is full charged.

In one form of the present invention a similar form of compensation is obtained in a rather simple manner by supplying the control circuit from a degraded voltage stabilizer. Thus, in one form of the invention the bistable circuit is arranged to respond to a control signal dependent on the difference between a rail voltage forming the supply to the bistable circuit and a signal dependent on the battery voltage, and the rail voltage and the charging current are derived from a common a.c. supply through a degraded voltage control circuit causing the rail voltage to vary slightly with that of the a.c. supply. Thus the voltage stabilizer may comprise a transistor controlling the rail voltage to follow that developed across a zener diode in series with a resistor.

Figure 2:
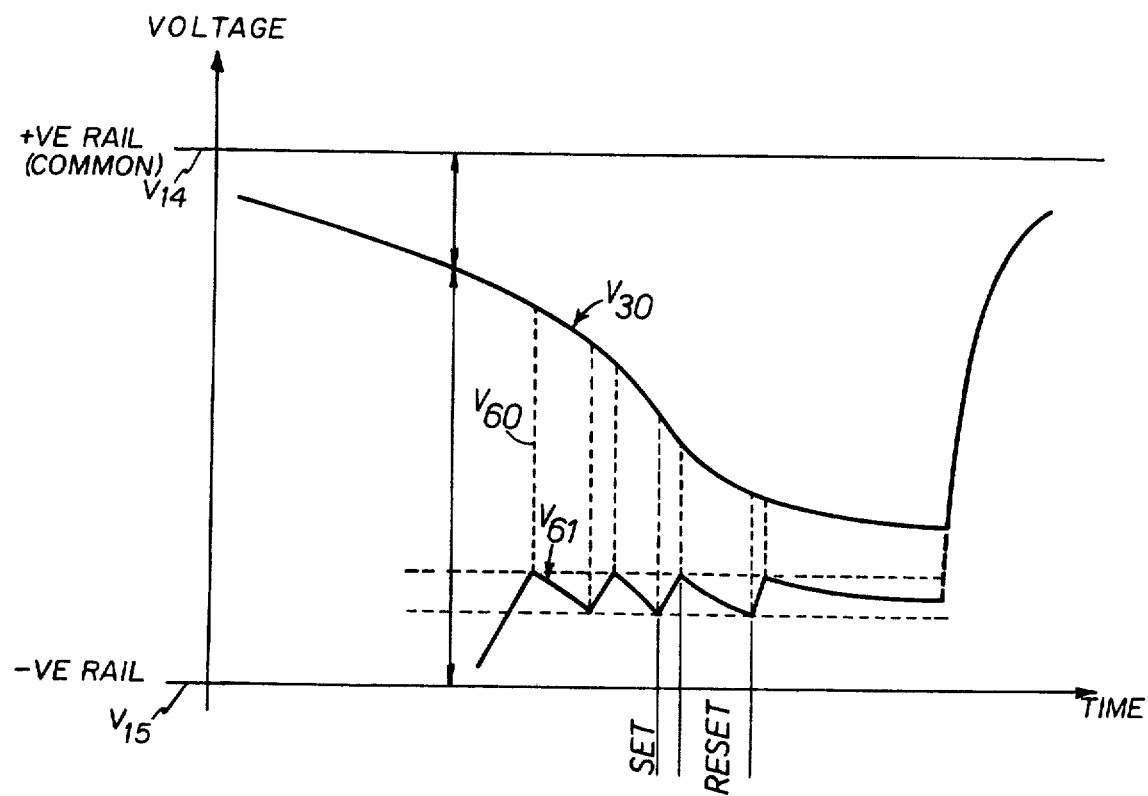
Figure 3:
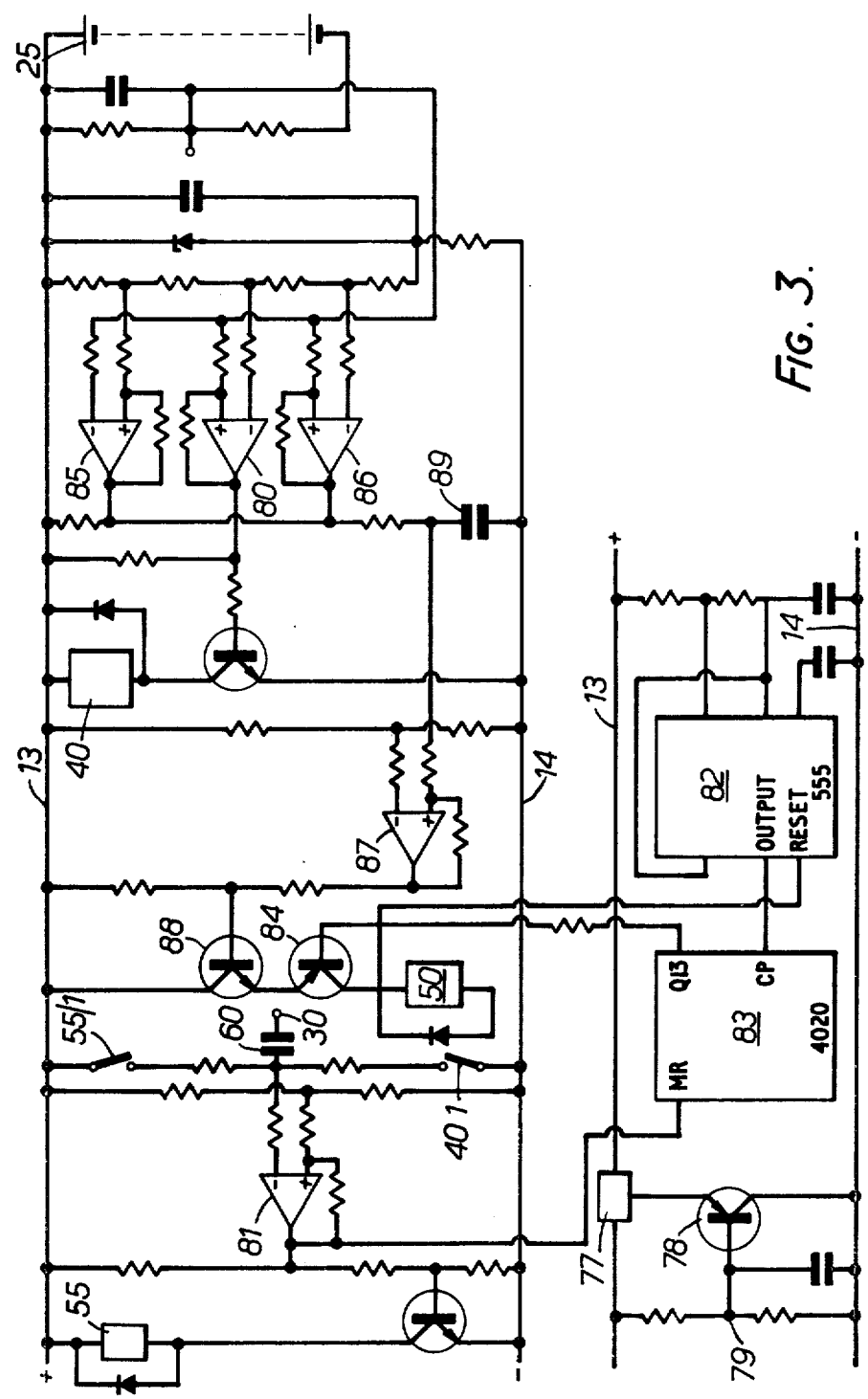

Further features and details of the invention will appear from the following description, given by way of example, of one specific embodiment, with reference to the accompanying drawings, in which:

FIG. 1 is a circuit diagram of one form of charger control apparatus embodying the invention, FIG. 2 is a graph diagrammatically illustrating the operation of the invention and FIG. 3 is a circuit diagram of a modified apparatus incorporating integrated circuits.

In the embodiment shown in FIG. 1 the invention is applied to an automatic charge controller for lead acid batteries.

Supply

The control circuit is fed from the alternating supply 10 through a transformer 11 and bridge rectifier 12 whose output is connected across a smoothing capacitor 13 and through a voltage stabilizer to positive and negative supply rails 14 & 15 for a control circuit. The voltage stabilizer comprises a transistor 14 having its collector connected through a diode 16 and resistor 17 to the positive output terminal of the bridge rectifier and its base connected to the latter through further resistors 18 & 19 to the negative rail through a resistor 20 and a zener diode 21 in series. Thus as in a normal voltage stabilizer the transistor 15 would compare the voltage across the rails with that across the zener diode and adjust the current to maintain the two equal and hence constant.

In order to provide compensation in accordance with a preferred feature of the present invention the additional resistor 20 is connected in series with the zener diode so that the voltage between the rails will vary with a.c. supply voltage.

In addition the resistor 18 is connected between the emitter and collector of a further transistor 22 having its base connected through a resistor 23 to the collector of the first transistor 15 so as to provide compensation for any variations of current taken by the control circuits.

The positive rail of the control circuit is connected to the positive terminal of the battery 25 and through a potential divider 26, 27 and contacts 28/1 of a delay relay 28 to the negative battery terminal 14. The tapping 30 of the potential divider will be referred to as a control terminal providing a control signal dependent upon battery voltage to certain points of the control circuit as described below. By varying the resistances of the potential divider 26, 27 the circuit can be tailored to charge batteries having different numbers of cells.

Delay

The delay relay 28 is shunted by a capacitor 29 and connected across the supply rails through a resistor 31. The purpose of this is to ensure that the control signal is not made available when a battery is connected to the charger until the alternating supply has been switched on and a short delay has elapsed.

Battery Voltage Detector

As indicated above the terminating means incorporates a rate measuring circuit arranged to respond when the battery voltage ceases to rise at the end of a charge, indicating that the battery is fully charged. During the early part of the charge the battery voltage rises quite slowly and there is a possibility that this would actuate the terminating means prematurely. Accordingly, the rate measuring circuit is rendered inoperative during the early part of the charge. For this purpose the circuit includes a long tailed pair of transistors 35, 36 one of which 35 has its base connected to a tapping point in a potential divider 37 connected across the supply rails whilst the other 36 has its base connected through a resistor 38 to the control terminal 30 referred to above. The collector circuit of the latter transistor includes the coil of a voltage responsive relay 40 which is shunted by a diode 41. In addition the collector is connected to the base of an auxiliary transistor 42 having its collector and emitter connected across a portion 43 of the voltage divider 37 supplying the companion transistor.

The arrangement is adjusted so that when the control signal reaches that corresponding to a battery voltage of 2.35 volts per cell (in the case of a lead acid battery) the transistors 35, 36 will switch over and energise the voltage responsive relay 40. At the same time the auxiliary transistor 42 will vary the ratio of the potential divider so that when the controller has terminated the charge and as a result the battery voltage falls fairly rapidly, the effect will not be simply to switch the charger on again. The charger will not be switched on again until the voltage falls to a substantially lower value, for example 1.8 volts per cell.

Timer

Charge is terminated by a terminating relay 50 connected in a timer circuit. This includes a timer F.E.T. 51 having its gate connected through a timing capacitor 52 shunted by a resistor 53 to the negative rail and through a resistor 54 and a contact 55/1 of a capacitor charge adjusting relay 55 (described below) to the positive rail. The source of the F.E.T. is connected direct to the positive rail whilst the drain is connected through a resistor 56 to the base of a timing transistor 57 having its emitter connected through a zener diode 58 to the negative rail and its collector connected through the coil 50 of the terminating relay shunted by a diode 59, to the positive rail. The terminating relay has contacts 50/1 in a circuit of a contactor controlling the charging current.

Accordingly, when the capacitor charge adjusting relay 55 is energised, one of its contacts 55/1 will connect the timing capacitor 52 across the supply rails and charge it up, causing the timer F.E.T. 51 to conduct, and through the timer transistor 57, energise the terminating relay 50 to allow charging current to flow when the charge adjusting relay 55 is de-energised and its contacts 55/1 open, the timer capacitor 52 will gradually discharge and if it is not topped up again wthin a predetermined time, for example one hour, the timer F.E.T. 51 will cease to conduct, the terminating relay 50 will be de-energised and the charging current will be switched off.

Rate Measuring Bistable circuit

The rate measuring circuit comprises a rate measuring capacitor 60 having one terminal connected to the control terminal 30 referred to above, and its other terminal connected to the gate of a rate measuring F.E.T. 61 and in addition through a resistor 62 and a contact of the voltage responsive relay to the negative supply rail, and through a resistor 63 and a charge adjusting contact 55/2 of the charge adjusting relay to the positive supply rail. The source of the F.E.T. 61 is connected directly to the positive rail whilst the drain is connected through a resistor 64 to the base of a first transistor 65 whose emitter is connected through a variable resistor 66 and a zener diode 67 to the negative rail, whilst its collector is connected to the base of a second transistor 68 and through a resistor 69 to the positive rail. The emitter of the second transistor 68 is connected to the base of one of a pair of transistors 70, 71 connected to form a Schmitt trigger. The collector of the first Schmitt transistor 70 is connected through the coil 55 (shunted by a diode 72) of the charge adjusting relay to the positive rail.

Thus, when the F.E.T. conducts, the first transistor 65 conducts, the second transistor 68 cuts off, and the neighbouring transistor 70 of the Schmitt also cuts off, and de-energises the capacitor charge adjusting relay 55. Under these conditions the gate of the rate measuring F.E.T. 61 may be described as floating, in that it is not connected to anything except the rate measuring capacitor 60. Accordingly, the charge on the capacitor 60 remains constant, and as the voltage of its other terminal, namely the control terminal 30 varies with the battery voltage, becoming progressively more negative, the gate of the F.E.T. 61 will also become progressively more negative until a point is reached at which the Schmitt switches over again. The time taken for this to occur will of course depend upon the rate of the rise of the battery voltage and the action will occupy a long period when the battery approaches the fully charged condition and and its voltage ceases to increase appreciably.

It will also be appreciated that whereas the battery control signal is applied between the control terminal 30 and the positive rail 13 (which is connected to the positive battery terminal) the F.E.T. 61 functions according to the potential of its gate in relation to that of the negative rail. The degrading of the voltage control of the supply to the rails is chosen so that any variations of battery voltage which are due simply to variation of the a.c. supply voltage will be substantially balanced out so as to avoid spurious termination.

It will be seen that the rate-measuring F.E.T. 61, the Schmitt trigger circuit 70, 71 and the capacitor charge-adjusting relay 55 together form a bistable circuit. Of its two states it is immaterial which is referred to as set and which is reset, but for identification herein the circuit is referred to as set when the F.E.T. 61 is non conducting and the relay 55 is energised. The circuit switches between its set state and its reset state as follows:

With the bistable circuit SET the gate of the F.E.T. 61 is relatively negative and the F.E.T. cut off, the relay 55 is energised with its charge-adjusting contacts 55/1 closed so that the capacitor 52 is being discharged and the gate of the F.E.T. 61 is fairly rapidly becoming more positive, until the F.E.T. conducts enough the switch the Schmitt and reset the bistable circuit. In effect, the combination of the bistable circuit with the capacitor acts as a monostable circuit.

With the bistable circuit RESET the F.E.T. gate is relatively positive and the F.E.T. is conducting, the relay 55 is de-energised with its charge-adjusting contacts 55/2 open so that the charge of the capacitor 60 remains unaltered and the F.E.T. gate becomes more negative as the battery voltage rises (being equal to the positive rail voltage minus the battery voltage sample). If the battery voltage is increasing the F.E.T. current falls enough to switch the Schmitt circuit to set the bistable circuit.

It is believed that the operation of the apparatus will be clear from the above description.

At the start of the charge the battery voltage will normally be low (below 2.35 volts per cell) the control terminal 30 will be relatively positive, and the long tailed pair 35, 36 will energise the voltage responsive relay 40 and close its contact 40/1 so as to charge the gate of the rate measuring F.E.T. 61 and the terminal of the rate measuring capacitor 60 connected to it to a negative potential approaching that of the negative rail. This causes the F.E.T. 61 to cut off and the charge adjusting relay 55 to be energised, closing its contacts and setting the bistable circuit.

One of these contacts 55/1 charges the timing capacitor 52 operating the timer F.E.T. 51 and energising the terminating relay to switch on the charging current.

When the battery voltage rises above 2.35 volts per cell the long tailed pair 35, 36 switches over and de-energises the voltage-responsive relay 40 opening its contact 40/1 so that the gate of the F.E.T. 61 is no longer anchored to the negative rail. At the same time the part 43 of the voltage divider 37 of the long tailed pair is short circuited so that after the charge has been terminated it will not start again when the voltage falls due to the cessation of the charging current.

The subsequent operation is illustrated by the diagrammatic graph of FIG. 2 in which the voltage V30 of the control terminal and the voltage V61 of the gate of F.E.T. 61 are plotted against time between the voltages V13 and V14 of the positive and negative rails. It will be seen that the curve of the control terminal V30 is similar to an inversion of the battery voltage curve. The difference between the voltage V30 and the voltage V61 at any moment represents the voltage of the capacitor 60.

Thus when the bistable circuit is set, the capacitor charge adjusting relay 55 being energised, the rate measuring capacitor 60 discharges as described above, the gate of the F.E.T. 61 becomes progressively more positive until it resets the Schmitt and de-energises the charge adjusting relay 55 and resets the bistable circuit as mentioned above. This action occurs because the bistable circuit and capacitor together form a monostable.

With the bistable circuit reset, as referred to above, the gate of the F.E.T. 61 is floating, being connected only to the rate measuring capacitor 60, and hence the potential of the gate varies with that of the control terminal, maintaining a constant difference of potential across the capacitor 60. Thus as the battery voltage rises and the voltage V30 of the control terminal 30 falls, the gate of the F.E.T. 61 also becomes more negative producing a downwardly sloping portion of the curve V61.

This continues until it causes the Schmitt to set and further discharge the capacitor 60 by energising the capacitor charge adjusting relay 55.

Accordingly, the voltage curve of the gate of the F.E.T. 61 will have a saw tooth form as shown diagrammatically in FIG. 2.

Each time the charge adjusting relay 55 is energised and closes its contacts 55/1 it serves to top up the timing capacitor 52 as already referred to, so that the timer F.E.T. 51 continues to conduct and maintains the charge.

This operation is repeated at intervals which become progressively longer as the rate of rise of battery voltage falls off as the battery approaches the fully charged condition.

A point is reached, at which the interval is so long that the timing capacitor 52 becomes discharged to the point at which is no longer exceeds that of the zener diode 58 in the timing circuit, so that the terminating relay 50 becomes de-energised and the charge is switched off.

It will be appreciated that the invention is not limited to the arrangement shown in FIG. 1. In particular, many of the discrete components of FIG. 1 may be replaced by integrated circuits.

One such arrangement is shown in FIG. 3. The operation of this arrangement is very similar to that of FIG. 1 and parts closely resembling those of FIG. 1 bear the same reference numerals. The arrangement differs in the following respects.

The degraded voltage regulator 15, 20, 21 of FIG. 1 is replaced by an integrated circuit 77, a transistor 78 and a potential divider 79. In the voltage responsive circuit for preventing termination when the battery voltage is below 2.35 volts per cell, the long tailed pair 35, 36 is replaced by an integrated circuit 80. In the rate measuring circuit the F.E.T. 61 and amplifier 65, 68, 70 forming the bistable circuit are replaced by an integrated circuit 81. In the timer, the transistor capacitor network 52, 53, 54 is replaced by a digital clock oscillator 82 and a digital counter 83. In the terminating circuit the F.E.T. 51 transistor 56 and zener diode 58 are replaced by a transistor 84.

The operation of the arrangement of FIG. 3 is very similar to that of FIG. 1 and will only be described briefly.

The integrated circuit 81 is a high impedance operational amplifier (or a normal operational amplifier fed through a high impedance device) having the inverting input connected through the capacitor 60 to the control terminal 30 so as to follow the battery voltage. When the potential of this input is forced lower than that of the non-inverting input, the output goes high, resetting the timer counter 83 and at the same time energising the capacitor charge adjusting relay 55. The contact 55/1 of this closes, causing the capacitor to discharge and the operational amplifier output to go low. The relay 55 then de-energises and the cycle of events is repeated until the battery is fully charged. When the time taken for the battery voltage to rise sufficiently to set the bistable circuit exceeds the predetermined period corresponding to the count Q13 of the timer counter, that count goes high and de-energises the relay 50 which has contacts controlling the contactor which opens and terminates the charge.

The operation of the integrated circuit 80 is analagous to that of the long tailed pair 35, 36. When the battery voltage is below 2.35 volts per cell (in the case of a lead acid battery) the output is high energising the relay 40 to close contacts 40/1 which ties down the voltage of the inverting input of the amplifier 81 and prevents the timer from operating. When the battery voltage exceeds 2.35 volts per cell the contact 40/1 opens, allowing the rate measuring circuit to operate as described.

FIG. 3 also includes two further integrated circuits 85 and 86 performing functions that are not provided in FIG. 1, namely to prevent the charger being switched on unless the battery voltage is below an upper limit and above a lower limit. Only under this condition can the outputs of both amplifiers be high, allowing a further amplifier 87 to switch on a transistor 88 in the circuit of the relay 50. A capacitor 89 also provides a time delay.

It will be appreciated that the above description refers to the main parts of the circuit and sundry further components, for example smoothing capacitors, and resistors, not to mention pilot lamps fuses and the like, will be included in accordance with requirements.

What I claim as my invention and desire to secure by Letters Patent is:

1. Automatic electric battery charging apparatus including terminating means responsive to the rate of change of a control signal, dependent on the battery voltage while on charge for initiating the termination of a phase of the charge when the rate of change of the said signal falls below a predetermined value, the terminating means including a capacitor and a bistable circuit having set and reset conditions, means for supplying the control signal dependent on battery voltage on charge through the capacitor to an input of the bistable circuit, so as to set the circuit when the battery voltage increases, capacitor charge adjusting means operative when the bistable circuit is set, for supplying current to the capacitor to adjust the charge of the latter until it re-sets the bistable circuit, and a timer arranged to be reset by the bistable circuit in its set state, and means to terminate the charge or reduce the average charging current if the timer is not reset within a predetermined time.

2. Apparatus as claimed in claim 1 in which the input of the bistable circuit is of high impedance.

3. Apparatus as claimed in claim 2 in which the input of the bistable circuit comprises a field effect transistor.

4. Apparatus as claimed in any one of the preceding claims which includes means for charging the capacitor initially when the battery voltage is low and in which the charge adjusting means serves to progressively reduce the charge on the capacitor.

5. Apparatus as claimed in claim 4 further comprising:

the bistable circuit being arranged to respond to the control signal which is dependent on the difference between a rail voltage forming the supply to the bistable circuit and a signal dependent on the battery voltage, and a degraded voltage control circuit for deriving the rail voltage and the charging current from a common a.c. supply, said degraded voltage control circuit causing the rail voltage to vary slightly with that of the a.c. supply.

6. Apparatus as claimed in claim 5 in which the voltage stabilizer comprises a transistor, a zener diode and a resistor in series with the zener diode, said transistor controlling the rail voltage to follow that developed across the zener diode and the resistor.

* * * * *